United States Patent
Kang et al.

(10) Patent No.: US 7,164,837 B2
(45) Date of Patent: Jan. 16, 2007

(54) METHOD OF FABRICATING OPTICAL WAVEGUIDE DEVICES WITH SMOOTH AND FLAT DIELECTRIC INTERFACES

(75) Inventors: Joon Mo Kang, Daejeon (KR); My The Doan, Singapore (SG); Desmond R. Lim, Singapore (SG)

(73) Assignees: Agency for Science, Technology and Research, Singapore (SG); Photonics Concepts Pte. Ltd., Singapore (SG)

( * ) Notice: Subject to any disclaimer, the term of this patent is extended or adjusted under 35 U.S.C. 154(b) by 155 days.

(21) Appl. No.: 10/727,201

(22) Filed: Dec. 3, 2003

(65) Prior Publication Data

US 2004/0120677 A1 Jun. 24, 2004

Related U.S. Application Data

(60) Provisional application No. 60/431,340, filed on Dec. 6, 2002.

(51) Int. Cl.
G02B 6/10 (2006.01)
(52) U.S. Cl. .................. 385/129; 385/130; 385/131
(58) Field of Classification Search ......... 385/129–131
See application file for complete search history.

(56) References Cited

U.S. PATENT DOCUMENTS

| 4,954,459 A | 9/1990 | Avanzino et al. ........... 437/228 |
|---|---|---|
| 5,199,092 A | 3/1993 | Stegmueller .................. 385/50 |
| 5,510,652 A | 4/1996 | Burke et al. ................. 257/752 |
| 5,851,899 A | 12/1998 | Weigand ...................... 438/427 |
| 5,863,828 A | 1/1999 | Snyder ......................... 438/437 |
| 6,258,711 B1 | 7/2001 | Laursen ....................... 438/633 |
| 6,922,508 B1* | 7/2005 | Glebov et al. ................. 385/43 |
| 6,946,238 B1* | 9/2005 | Zhang et al. ................. 430/321 |
| 2003/0007535 A1* | 1/2003 | Haase et al. .................. 372/50 |
| 2003/0161571 A1* | 8/2003 | Davids et al. ................ 385/14 |
| 2003/0215189 A1* | 11/2003 | Lee et al. ..................... 385/50 |

OTHER PUBLICATIONS

"PECVD Growth Multiple Core Planar Waveguides with Extremely Low Interface Reflections and Losses" by Christian Laurent-Lund et al., IEEE Photonics Tech. Letters, vol. 10, No. 10, Oct. 1998, pp. 1431-1433.

* cited by examiner

Primary Examiner—Kaveh Kianni
(74) Attorney, Agent, or Firm—Saile Ackerman LLC; Stephen B. Ackerman; Stephen G. Stanton (57) ABSTRACT

One or more embodiments of the instant invention may be briefly summarized as follows. A planarization and smoothing segment includes: (a) a reverse mask and etching method; a sacrificial layer and selective CMP followed by non selective CMP; or a sacrificial layer and selective etching followed by non-selective CMP. A buffer layer to protect wave guide segment includes: (a) waveguide formation followed by buffer layer deposition; or a buffer deposition over the waveguide layer followed by waveguide formation.

15 Claims, 11 Drawing Sheets

METHOD OF FABRICATING OPTICAL WAVEGUIDE DEVICES WITH SMOOTH AND FLAT DIELECTRIC INTERFACES

This application claims priority to U.S. Provisional Patent Application Ser. No. 60/431,340, filed on Dec. 6, 2002, which is herein incorporated by reference.

FIELD OF THE INVENTION

The present invention relates generally to semiconductor fabrication and more specifically to optical waveguide devices.

BACKGROUND OF THE INVENTION

Optical waveguides are extremely sensitive to surface and other interface imperfections which can cause scattering. Plasma processing of materials can cause residual plasma damage, which results in surface roughness and scattering.

Planar optical waveguides often require thick layers (1–20 microns thick) to be compatible with optical fiber dimensions, with typical core dimensions of 8–10 microns. However, these typically thicker layers cause critical process issues in fabricating waveguide devices. For example, the planarity, flatness and surface smoothness of a waveguide, which are the most critical of parameters that determine scattering loss of the waveguide, deteriorate with excessive topography during planarization and over-etching respectively. The problems become apparent when the device fabrication process requires the integration of more than one waveguide core, where the integrated waveguide cores are of different dimensions or are not coplanar. In the case where the waveguide core dimensions are different, planarization and mechanisms to protect the top surface of at least one of the waveguides during etch will be needed.

U.S. Pat. No. 5,199,092 to Stegmueller describes an optical waveguide device.

U.S. Pat. No. 4,954,459 to Avanzino et al. describes a planarization method using a sacrificial layer.

U.S. Pat. No. 5,510,652 to Burke et al. describes a chemical mechanical polishing (CMP) method using differing polish rates.

U.S. Pat. Nos. 5,863,828 to Snyder and 5,851,899 to Weigand describe planarization methods using both etching and CMP.

U.S. Pat. No. 6,258,711 to Laursen describes a CMP process with a sacrificial layer that polishes at a different rate than the fill layer to be planarized.

The Christian Laurent-Lund et al. article entitled "PECVD Grown Multiple Core Planar Waveguides with Extremely Low Interface Reflections and Losses"; IEEE Photonics Technology Letters, Vol. 10, No 10, pages 1431 to 1433; October, 1998 discloses a method of optical waveguide device fabrication using planarization by reverse masking and precise etching.

SUMMARY OF THE INVENTION

Accordingly, it is an object of one or more embodiments of the present invention to provide a method to fabricate optical waveguide devices to create smooth interfaces after plasma processing, which are compatible with current state of the art mass manufacturing fabrication tool sets.

Other objects will appear hereinafter.

It has now been discovered that the above and other objects of the present invention may be accomplished in the following manner. Specifically, in the first and third embodiments, at least one waveguide core portion is formed within at least one cladding portion. The waveguide core portion having an upper surface. The cladding portion having a higher portion over at least the waveguide core portion and a lower portion. A patterned sacrificial portion is formed over the lower cladding portion and a portion of the higher cladding portion, leaving a second portion of the higher cladding portion exposed. At least a portion of the higher cladding exposed portion is removed by a selective removal process selective to the patterned sacrificial portion leaving a remnant of the higher cladding exposed portion. Planarizing: the remnant of the higher cladding exposed portion over the waveguide core portion; and the lower cladding portion to: expose and smooth the upper surface of the waveguide core portion; and form a smooth upper surface of the cladding portion coplanar with the smooth upper surface of the waveguide core portion to form the substantially planar surface of an optical waveguide device. The second embodiment comprises the following steps. At least one waveguide core portion is formed within at least one cladding portion. The waveguide core portion having an upper surface. The cladding portion having a higher portion over at least the waveguide core portion and a lower portion. A patterned sacrificial portion is formed over the lower cladding portion and a portion of the higher cladding portion, leaving a second portion of the higher cladding portion exposed. The higher cladding exposed portion and the patterned sacrificial portion over the higher cladding exposed portion are removed by a planarization process, leaving exposed: the patterned sacrificial portion over the lower cladding portion; and a portion of the cladding portion adjacent the patterned sacrificial portion over the lower cladding portion. Planarizing at least: the patterned sacrificial portion over the lower cladding portion; and the portion of the cladding portion adjacent the patterned sacrificial portion over the lower cladding portion; to: expose and smooth the upper surface of the waveguide core portion; and form a smooth upper surface of the cladding portion coplanar with the smooth upper surface of the waveguide core portion to form the substantially planar surface of an optical waveguide device.

BRIEF DESCRIPTION OF THE DRAWINGS

The present invention will be more clearly understood from the following description taken in conjunction with the accompanying drawings in which like reference numerals designate similar or corresponding elements, regions and portions and in which:

FIGS. 1-A through 1-D shows a generic problem known to the inventors commonly encountered in waveguide fabrication. It is desired to planarize n1 and n2, with the resulting structure shown in FIGS. 2-D, 3-D and 4C.

FIG. 1-E is a cross-section of a planar dielectric waveguide that may also correspond to either FIG. 6 or FIG. 9-F.

FIGS. 2-A through 2-D, 3-A through 3-D and 4-A through 4-C show three embodiments of the process to fabricate the desired structure. Eventually this structure can be integrated into a more complex structure, an embodiment of which is shown in FIG. 6.

FIGS. 5-A through 5-H shows an embodiment of the process which allows one to embed dielectric n3 into a combination of one or more dielectrics (represented by n1 and n2 respectively).

FIGS. 8-A through 8-D shows the various waveguide configurations for one embodiment of this invention.

FIGS. 9-A through 9-F shows the process flows for another embodiment of this invention.

FIGS. 10-A through 10-C are related to the reverse masking and etching process of FIGS. 2-A to 2-D, and similarly for the reverse masking and etching assisted planarization of upper levels and illustrate that the region of the feature that is large is reverse etched while the region of the feature that is small enough to be easily planarized is not etched, with FIG. 10-B being a cross-sectional view of FIG. 10-A along line A—A and FIG. 10-C being a cross-sectional view of FIG. 10-A along line B—B.

DETAILED DESCRIPTION OF THE PREFERRED EMBODIMENT OF THE INVENTION

Problem/Information Known to the Inventors—not to be Considered Prior Art

The following is a problem/information known to the inventors and is not to be considered as prior art for the purposes of this invention.

Planarization refers to any method of fabrication in which a substrate with non-flat surfaces is made flat. See FIGS. 1-A to 1-D.

FIG. 1-C has a non-flat surface topology formed as a result of etching and deposition of subsequent layers (FIGS. 1-A and 1-B). These non-flat surfaces are detrimental to subsequent processing for a variety of reasons. The first is the limited depth of field of lithography, i.e. lithography machines are only able to produce sharp features over a limited range of topology. If the surfaces have too much height variations, the lithographic features cannot be sharp everywhere. The second difficulty with non-flat topology is that subsequent conformal deposition (e.g. with PECVD—Plasma Enhanced Chemical Vapor Deposition) will cause problems with voids and keyholes. This is a well know processing problem. The third problem with non-flat surfaces is that optical waveguides require flat surfaces to have low loss. Any waveguide over topology will have increased loss.

Optical waveguide geometries are typically on the order of tenths of microns to tens of microns. To integrate multiple waveguide cores on the same chip, some form of planarization such as reflow is required.

The problem of planarization can be solved using BPSG (boro-phospho-silicate glass). In this method, BPSG is deposited by LPCVD or PECVD and is then annealed at relatively high temperatures (800° C. or more). Nevertheless BPSG's main drawback is the requirement for substantial annealing to achieve a high level of planarity.

Figure 6:
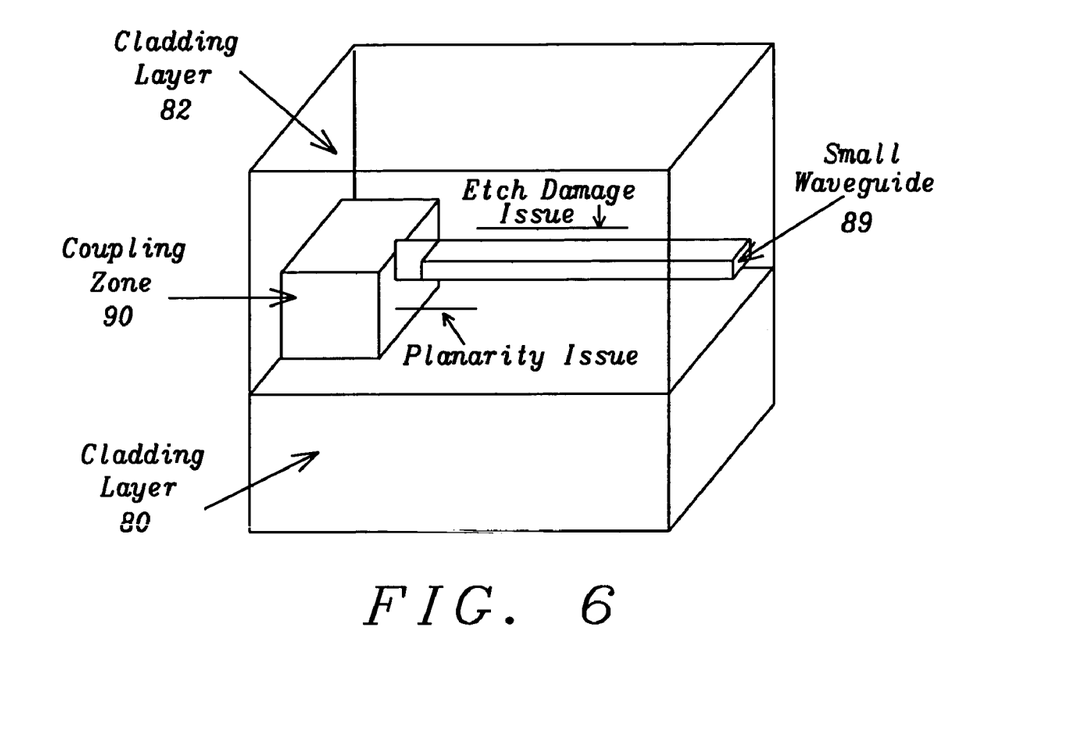
FIG. 6 shows the resulting 3-D structure of embedding waveguide material with index n3 partially in material with index n2 and partially material with index n1.

In FIGS. 1A to 1D, dielectric (n1) 10 is cladding material and dielectric (n2) 12 is core material and corresponds to the outer core depicted as coupling zone 90 in FIG. 6

FIG. 1-E shows a cross section of a typical planar dielectric waveguide, which is an example of a two-dimensional waveguide. FIG. 1-E may also correspond, in structure, to FIG. 6 or FIG. 9F. Low index difference waveguides, such as those used in optical chips and for the optical fiber waveguides for input to and output from optical chips, are three-dimensional versions of such planar dielectric waveguides. These low index difference waveguides include a core material 500 surrounded by a cladding material 502. The core material 500 can have an arbitrary cross-section, including a circular, elliptical, square, or rectangular cross-section embedded in the cladding material 502. The index of refraction n1 of the core material 500 is slightly larger than the index of refraction n2 of the cladding material 502. The index difference Δn for the index of refraction n1 of the core material 500 and the index of refraction n2 of the cladding material 502 (Δn=n1−n2) is therefore generally very small. A useful metric is delta (Δ), which is defined as Δn/n cladding for this type of waveguide, and is generally around 0.01 (1 percent) to 0.04 (4 percent), and certainly less than 0.1 (10 percent). In other words:

$$\Delta = (n1-n2)/n2 \ll 1.$$

A ray of light moving in the z direction in FIG. 1-D (into the paper) is guided by total internal reflection within the core material 500 if the angle of incidence θ of the ray with respect to the interface between the core material 500 and the cladding material 502 is larger than a critical angle θc. This critical angle θc equals sin-1(n2/n1). For low index difference waveguides, due to the indices of refraction n1, n2, the angle of incidence θ must be large in order for total internal reflection to guide the light ray through the waveguide.

The typical optical chips having low index difference waveguides are generally large, wafer-sized chips. This large size results because the low index difference waveguides can adequately guide light only if bends in the waveguides have large radii. If small bending radii are used with these low index difference waveguides, large losses result because light is loosely confined within the core material 500. Low index difference waveguides therefore function adequately without large losses only with relatively high bending radii, and it is therefore difficult to perform optical functions in small areas using these low index difference waveguides.

The use of higher index difference waveguides reduces the minimum bending radii while maintaining adequate performance (that is, low loss), and therefore reduces the area required to perform the optical functions. The index of refraction n1 of the core material 500 is significantly larger than the index of refraction n2 of the cladding material 502 for such a higher index difference waveguide. Delta (Δ) for a high index difference waveguide is typically at least as large as 0.1, 0.2, or 0.3. In other words:

$$\Delta = (n1-n2)/n2 \geq 0.1.$$

In such a high index difference waveguide, total internal reflection of light propagating through the waveguide is achieved for smaller angles of incidence θ for a ray of light, and the minimum bending radii for which performance is adequate is reduced.

One or more embodiments of the instant invention may be briefly summarized as follows:
I. Planarization and Smoothing
   A. Reverse mask and etching method (FIG. 2)
   B. Sacrificial layer and selective CMP followed by non selective CMP (FIG. 3)
   C. Sacrificial layer and selective etching followed by non selective CMP (FIG. 4)
II. Buffer Layer to Protect Wave Guide
   A. Waveguide formation followed by buffer layer deposition (FIG. 5)

B. Buffer deposition over waveguide layer followed by waveguide formation (FIG. 9).

This invention is particularly useful for minimizing losses in waveguides that have high index difference or have low minimum bending radius. It is also particularly useful when there are multiple cores which have different index difference or on different planes.

As a matter of convenience, cladding dielectric, waveguide core 2 and waveguide core 3 are described as (n1), (n2), and (n3) respectively. A person skilled in the art of optical waveguides will recognize that the dielectrics n1, n2 and n3 need not have uniform indices throughout their structure. These dielectrics may have a continuum or a series of indices.

This invention describes process methods to create smooth interfaces for optical waveguides. Smooth surfaces are required in waveguides to ensure minimal scattering losses. Creating smooth surfaces and interfaces are particularly challenging when there are at least two waveguide core regions on the same chip which are either non-coplanar and/or when there are at least two waveguide cores fabricated from dissimilar materials. These smooth flat surfaces are particularly important to minimize high scattering loss.

FIG. 1-E shows the desired cross section for a typical channel waveguide comprising a core 12 and a cladding 14. If the core is formed by photolithography and etching, the top surface of the core 103, could be rough. The roughness or nonflatness on surface 103 can be induced in variety of process steps. For example, roughness can be induced by plasma damage during the core etch and stripping of photoresist after the core etch. Non flat surfaces are created by the patterning and etching of layers, resulting in "step heights". FIGS. 1-A to 1-C illustrate this problem.

Chemo-mechanical polishing (CMP) is a good choice for planarization and smoothing of step heights as it is compatible with current CMOS process.

Optical waveguide geometries may be typically on the order of several microns to tens of microns, generating much larger step heights. To integrate multiple waveguide cores on the same chip, some form of planarization such as reflow or CMP (chemo-mechanical polishing) is required. The problem of planarization can be solved using BPSG (boro-phospho-silicate glass). In this method, BPSG is deposited by LPCVD (Low Pressure Chemical Vapor Deposition) or PECVD (Plasma Enhanced Chemical Vapor deposition) and is then annealed at relatively high temperatures (800° C. or more). BPSG's main drawback is the requirement for substantial annealing to achieve a high level of planarity.

With conventional planarization method alone such as CMP, planarizing a step height of 1 um, generally requires the removal or redistribution of a much thicker film (~2–4 um). The limitations of CMP are that even though planarization can be achieved by depositing and removing excess films, severe post-CMP thickness variation within wafer is inevitable if the step heights are excessive. For step heights thicker than ~2 um, it is practically impossible for CMP alone to meet the good planarity and within wafer dielectric thickness uniformity. Another issue involved with the thick coupling layer is that waveguide top surface is damaged during etching. This etch damage becomes more serious with the increase of coupling layer thickness.

Planarization Method One—FIGS. 2-A through 2-D

FIGS. 2-A through 2-D show the series of steps for producing substantially planar surface of optical waveguide device structures, by patterning and etching of selected areas to reduce polishing burden and applying chemical mechanical polishing for the planarization. The important idea is to etch the regions that are high, leaving behind tall thin structures 38 than can be easily planarized by CMP. The etch mask is therefore the reverse of the pattern of the dielectric layer n2. A person skilled in the art will appreciate that this reverse pattern can differ by a bias, that is, the pattern may slightly bigger or smaller than the pattern of dielectric layer n2.

Figure 10A:
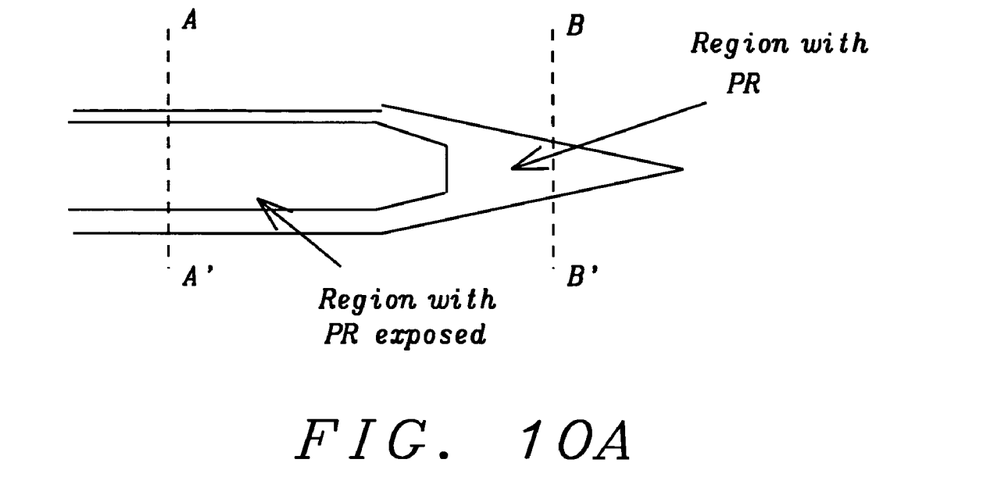
Figure 10B:
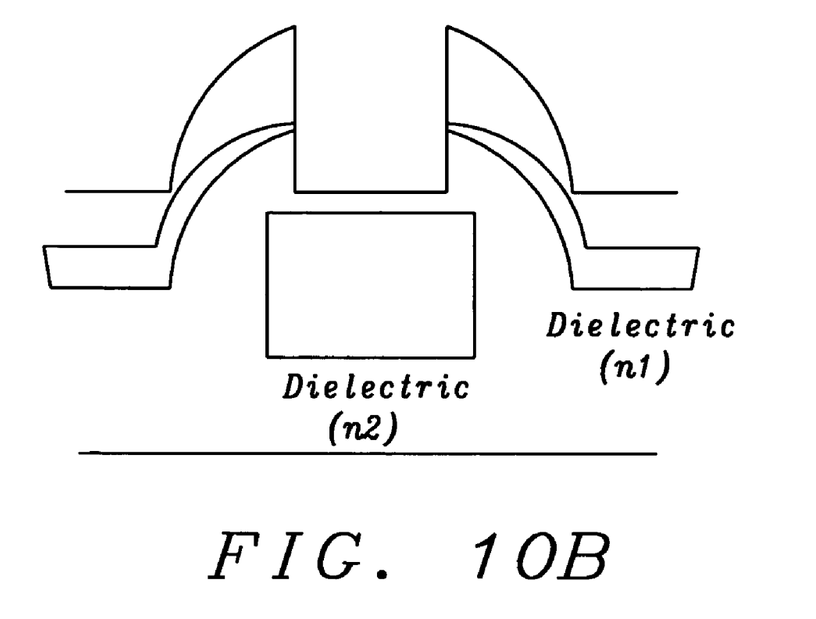
Figure 10C:
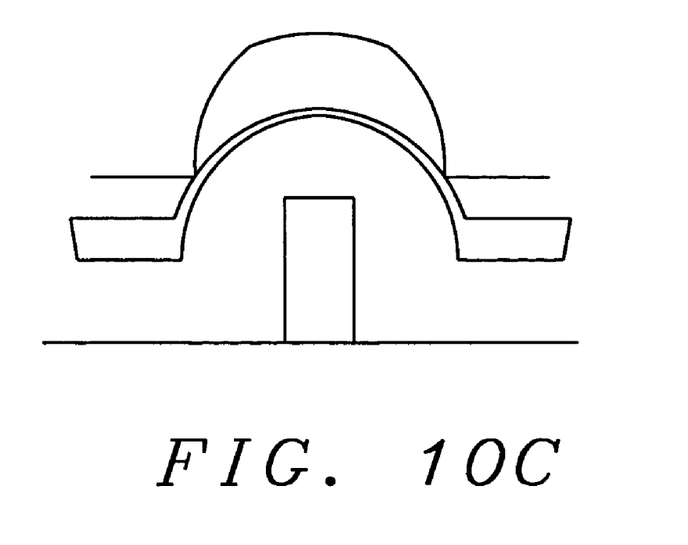

Further a person skilled in the art will appreciate that not all features need to be reversed. If the features are small enough, there is no need to create this reverse feature since these features will be easily planarized by CMP. Further for features in which parts of the features are small and parts of the features are big, the reverse mask features can be "clipped" in size. In this situation the reverse mask only allows the areas of the features that are large to be etched to relief polishing burden while areas of features that are small need not be etched. This ensures that the region of the feature that is large is reverse etched while the region of the feature that is small enough to be easily planarized is not etched, see FIGS. 10-A through 10-C.

FIG. 2-A, shows such a reverse mask 36, which is in this embodiment is photo-lithographically printed on the structure. The etch is then applied selectively (FIG. 2-B) in the areas which are on a high plateau, leaving behind tall pillars 38 (FIG. 2-C) which are easily removed by CMP (FIG. 2-D). The selective etching in FIG. 2-B is achieved by using an reverse mask 36.

Figure 3A:
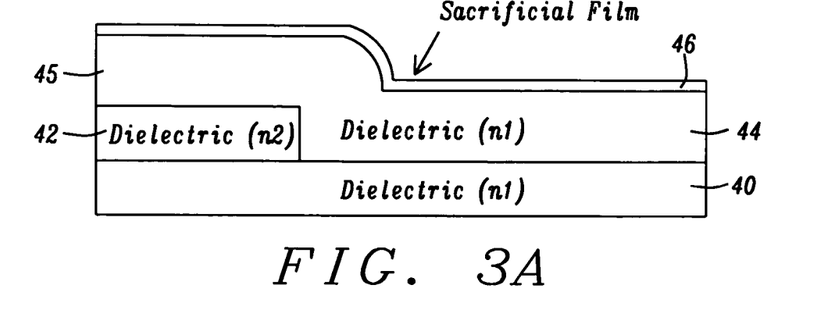
Figure 3B:
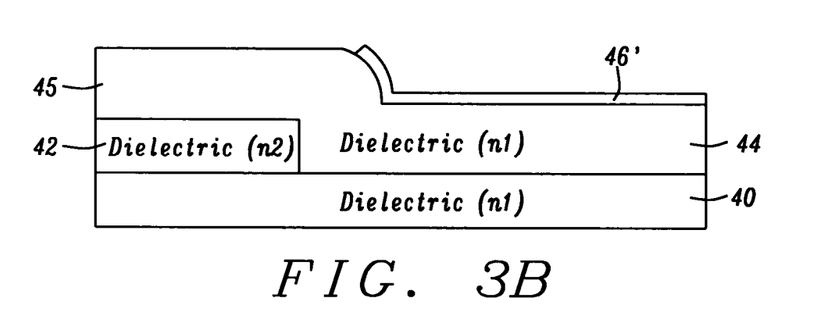
Figure 3C:
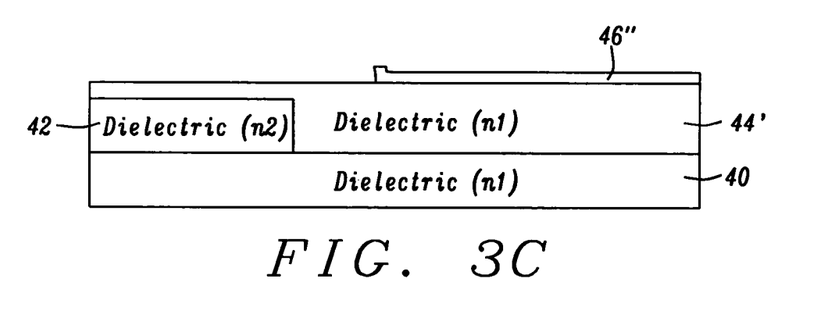
Figure 3D:
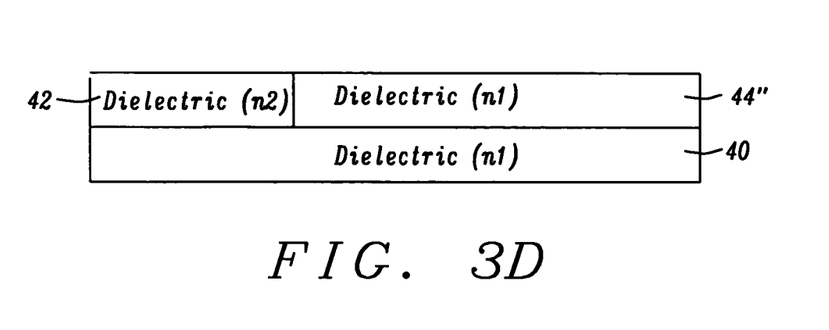
Figure 4A:
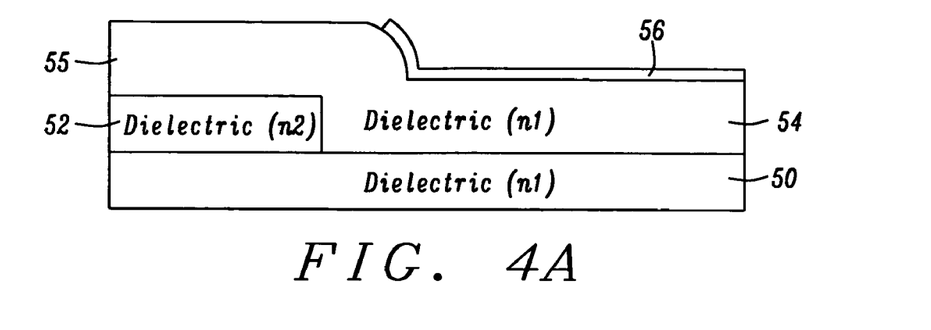
Figure 4B:
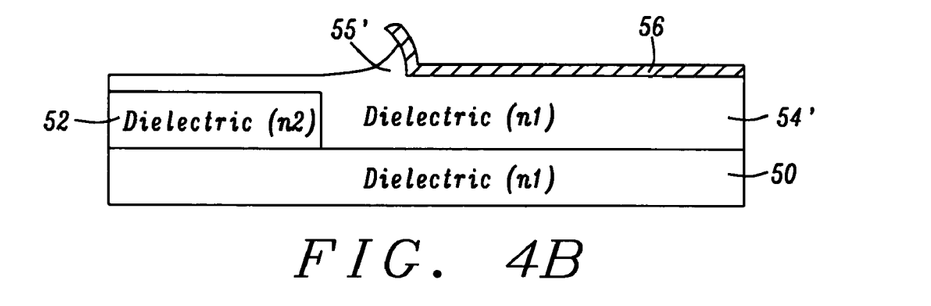
Figure 4C:
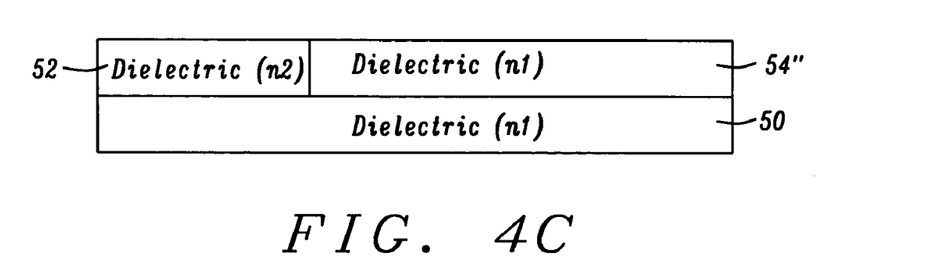

Planarization Methods Two and Three—FIGS. 3A Through 3-D and FIGS. 4A Through 4-C FIGS. 3-A through 3-D and 4-A through 4-C illustrate methods for producing substantially planar surface of optical waveguide device structures.

FIGS. 3-A through 3-D illustrates a method comprising of depositing a sacrificial layer 46 (FIG. 3-A) which shows different chemical behavior from the cladding dielectric 44; preferentially removing the sacrificial film 46 on higher areas 45 by chemical mechanical polishing by using slurry chemically active to the sacrificial layer 46 and 56 (FIGS. 3-B and 4-A); planarizing the areas 45 which are higher by chemical mechanical polishing using slurry of high removal selectivity, that is high cladding dielectric 44 removal rate and low sacrificial material 46 removal rate (FIG. 3-C) or etch selectively cladding dielectric 54' using chemistry only active, or having high etch selectivity, to the cladding dielectric 54 (FIG. 4-B); removing sacrificial layer 46" and 56 on down area and fine planarizing to the target using slurry chemically active to the sacrificial layer 46 and 56 (FIGS. 3-D and 4-C). The entirety of the higher areas 45 of the high cladding dielectric 44 (with the portion of the patterned sacrificial layer 46' over the higher areas 45 of the high cladding dielectric 44) is/are removed by CMP as shown in FIG. 3-C as a selective etch is used to stop on 46".

The sacrificial layer 56 material can be, but not limited to, one or more of photoresist or photoresist stacking on one of the following films: silicon nitride, silicon oxynitride organic silicate glass, diamond like carbon, silicon dioxide, polyimide, PMMA, tantalum, tungsten and molybdenum. The cladding dielectric can be but is not limited to silicon dioxide, silicon nitride, organic silicate glass, polyimide and PMMA.

The sacrificial layer 46 for the planarization method two may be SiN, organo-silicate glass (OSG), diamond-like carbon (DLC) or refractory metals (W, Ta, Mo . . . ).

Figure 5A:
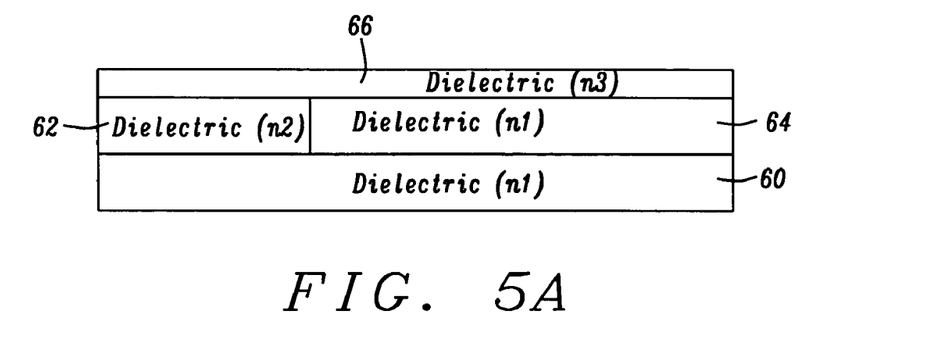
Figure 5B:
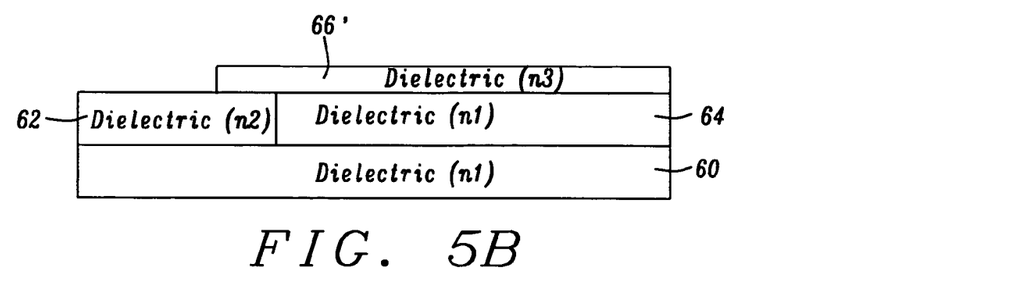
Figure 5C:
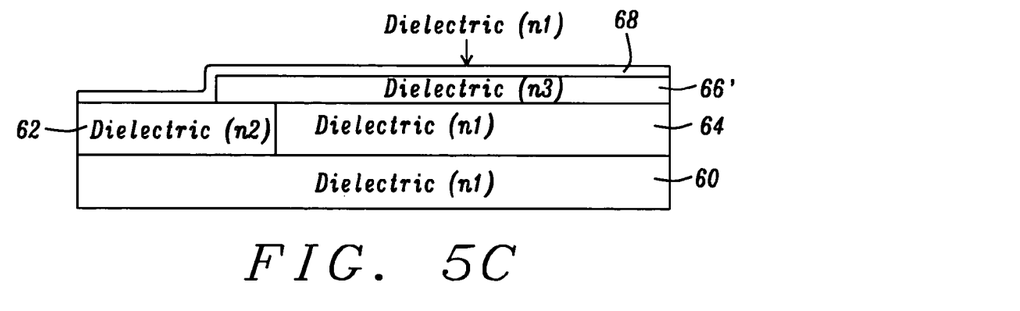
Figure 5D:
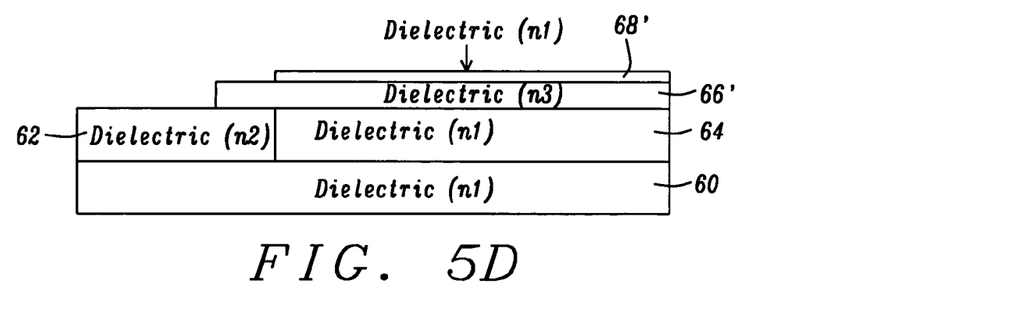
Figure 5E:
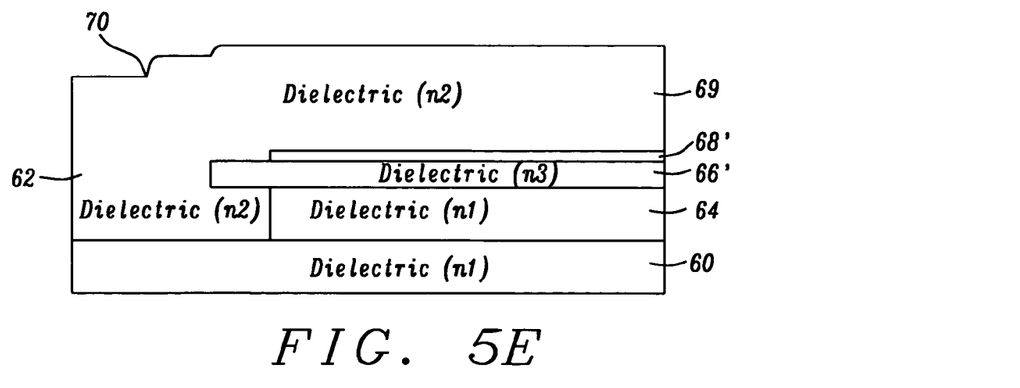
Figure 5F:
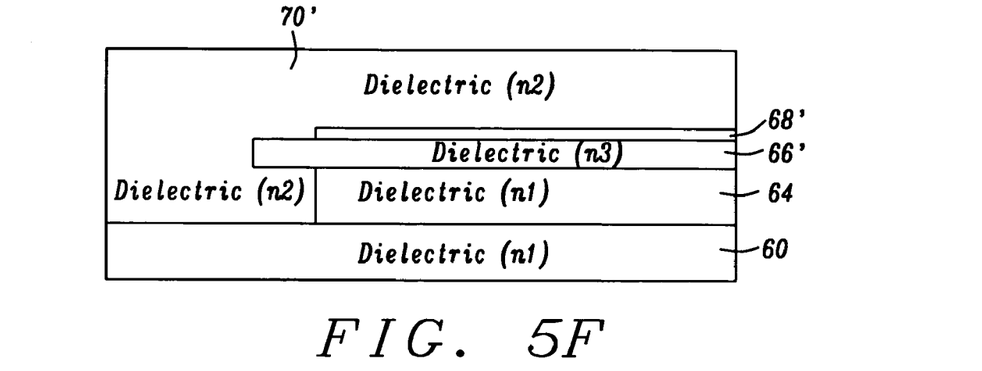
Figure 5G:
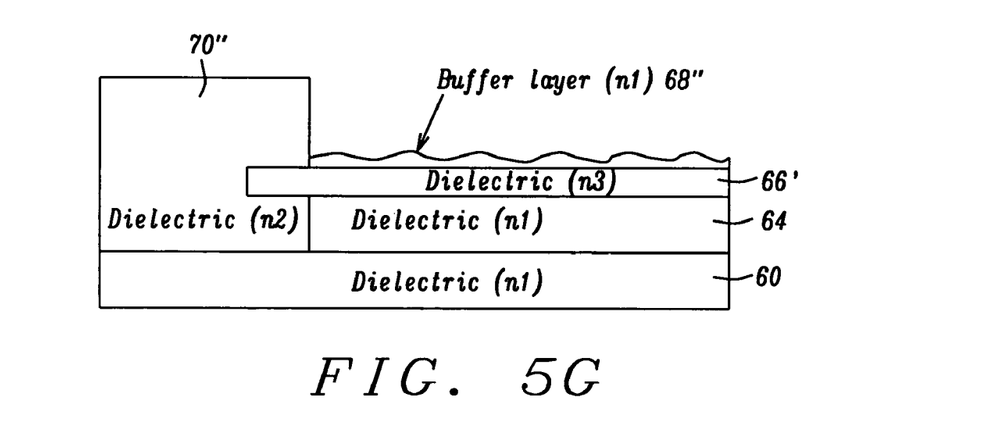

Etch Damage Free Waveguide Formation Method With Buffer Layer 66—FIGS. 5A Through 5-H FIGS. 5-A through 5-H show a method for producing etch-damage free optical waveguide structures, which comprises: depositing etch buffer layer 68 after waveguide 66' formation (FIGS. 5-A, 5-B and 5-C); etching of buffer layer 68 except on the top of waveguide 66' (FIG. 5-D); depositing extra dielectric n2 69 (FIG. 5-E); optionally planarizing coupling dielectric 70 surface (FIG. 5-F) (with 69 and 70 being the same material); forming upper part of coupling zone by patterning and etching with buffer layer 68' being etched also but not fully to protect the waveguide 66' (FIG. 5-G); depositing cladding dielectric 72 (FIG. 5-H).

A person skilled in the art will recognize that these techniques are equally applicable when the dielectrics n1 and n2 are the same or similar material.

An Embodiment of a Waveguide Structure for Which the Invention is Useful—FIG. 6

Figure 1A:
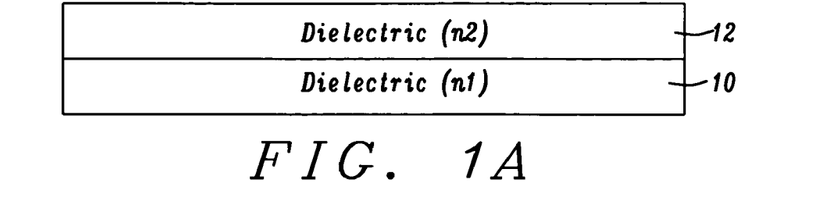
Figure 1B:
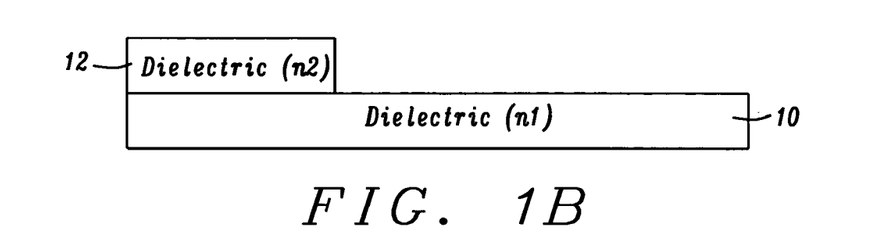
Figure 1C:
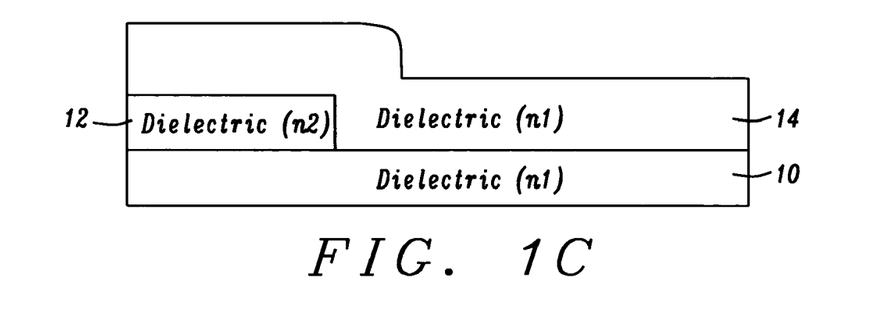
Figure 1D:
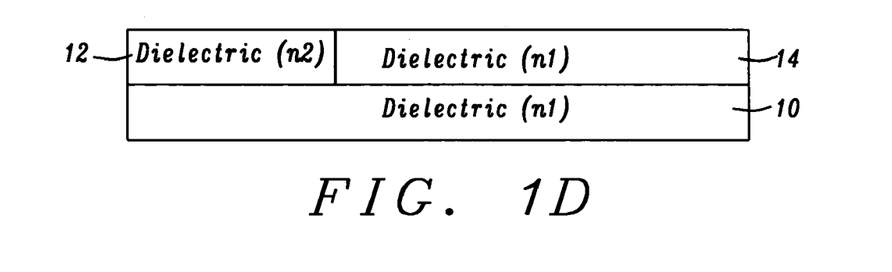
Figure 1E:
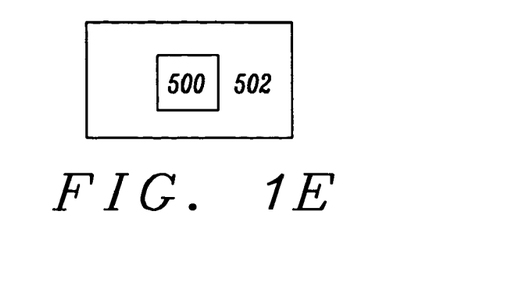
Figure 2A:
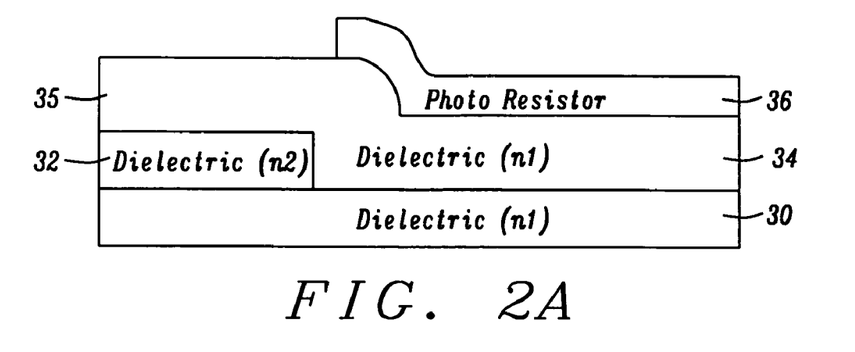
Figure 2B:
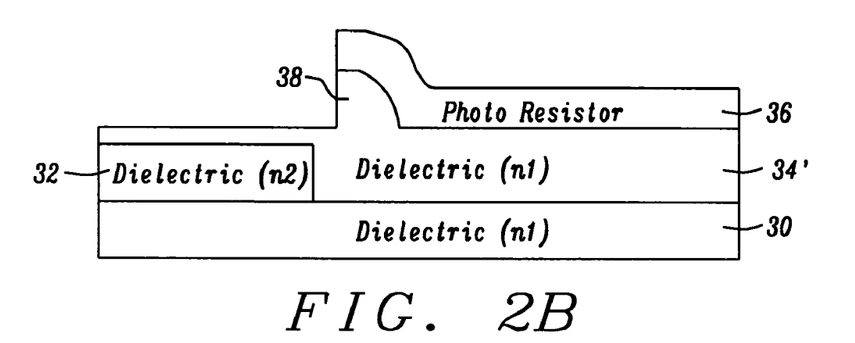
Figure 2C:
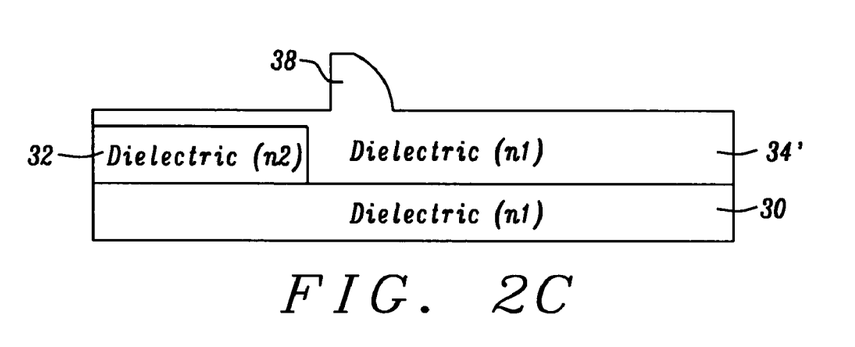
Figure 2D:
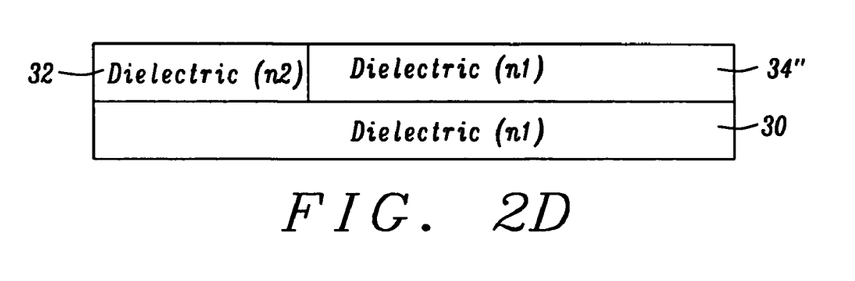

FIG. 6 shows a particular embodiment that was demonstrated by the inventors. In this embodiment, a high index difference waveguide 89 is partially (as shown in FIG. 6) or wholly embedded (not shown) in the low index waveguide (coupling zone 90) and are in any event within cladding layer 82 that is over cladding layer 80. The sequence of steps as illustrated in FIGS. 2-A through 4-C can be applied to the processing of the combination of the coupling zone 90 and the high index difference waveguide 89.

Figure 7:
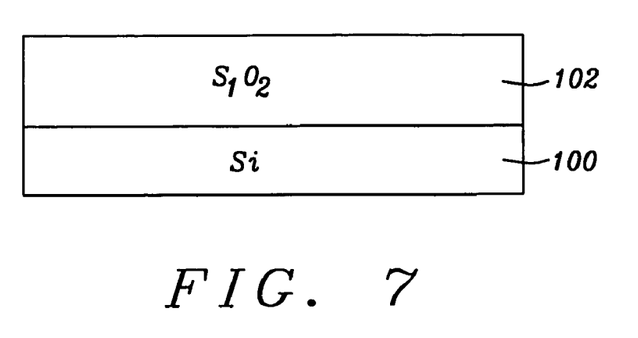
FIG. 7 shows the result of post-processing in one embodiment of this invention.
Figure 8A:
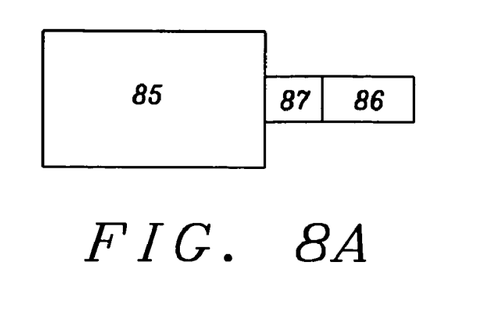
Figure 8B:
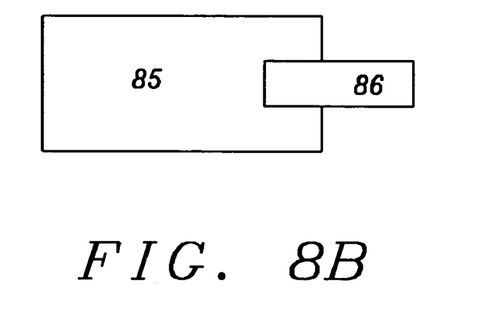
Figure 8C:
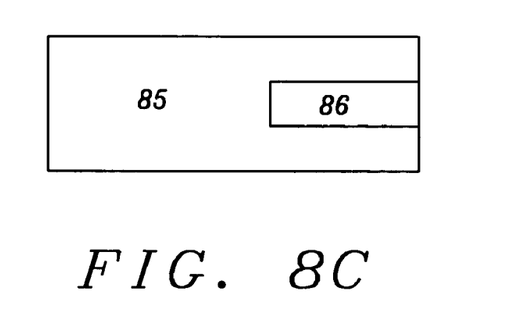
Figure 8D:
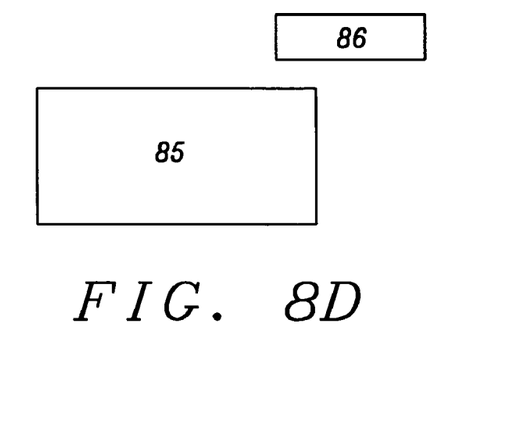

Results of Post CMP Processing—FIG. 7

FIG. 7 shows that a very high degree of planarization can be obtained by chemical mechanical polishing. This planarization is more than sufficient for optical applications even for high index difference waveguides.

Configurations of Multiple Waveguide Cores for Which This Invention is Particularly Useful—FIGS. 8-A Through 8-D FIGS. 8-A, 8-B, 8-C, 8-D show the various additional configurations and embodiments for which this invention is particularly useful.

In these figures, light from one core 85, is coupled to another waveguide core 86. Light may travel from left to right, i.e. from the waveguide core 85 to waveguide core 86 or conversely light may travel from right to left from waveguide core 86 to waveguide core 85. A person skilled in the art will recognize that if region around 85 and 86 provides for a reciprocal system, the system will be bi-directional, i.e. light may travel from left to right in the device as well as from right to left. As explained below, CMP is very useful for fabricating such structures shown in FIGS. 8-A through 8-D.

Figure 5H:
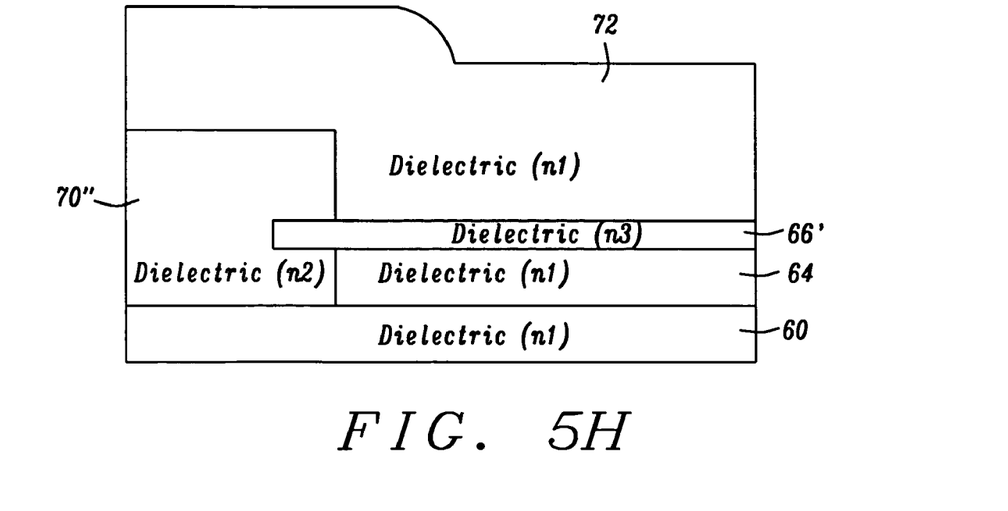

FIG. 8-A is an embodiment of the two cores 85, 86 being coplanar. In this case cores 85 and 86 are fabricated from dissimilar materials or have dissimilar shapes. For illustration purposes, there may be a gap 87 of vacuum or filled with air, or some other material between the two cores 85, 86. Neverthless, the presence of gap 87 is not necessary and does not materially change the operation of this device. In the application of the invention to the embodiment shown in FIG. 8-A, the process steps in FIGS. 2-A through 5-H can be applied to the fabrication of both waveguide cores 85 and 86.

FIGS. 8-B and 8-C show other embodiment of two cores 85, 86 being coplanar. In these case, the smaller waveguide core 86 is partially (FIG. 8-B) or wholly (FIG. 8-C) embedded in the larger waveguide core 85. In the application of the invention to the embodiment shown in FIG. 8-B or FIG. 8-C, the process steps in FIGS. 2-A through 5-H can be applied to the fabrication of both waveguide cores 85 and 86.

FIG. 8-D shows embodiments of two cores 85 and 86 being non coplanar. The relative height position of cores 85 to 86 can be reversed. Core 86 is shown to be above core 85 for illustration purposes. Nevertheless, the positions of cores 86 and 85 can be reversed. In addition, the relative positions of cores 86 and 85 with each other are determined by optical efficiency and ease of fabrication concerns. The invention is equally applicable in siutations in which core 85 is partially/wholly embedded in core 86 or vice versa. In addition, in this embodiment, the device is applicable useful even if the cores 85 and 86 are made from identical materials. In the application of the invention to the embodiment shown in FIG. 8-D, the process steps in FIGS. 2-A through 5-H can be applied to the fabrcation of both waveguide cores 85 and 86.

Figure 9A:
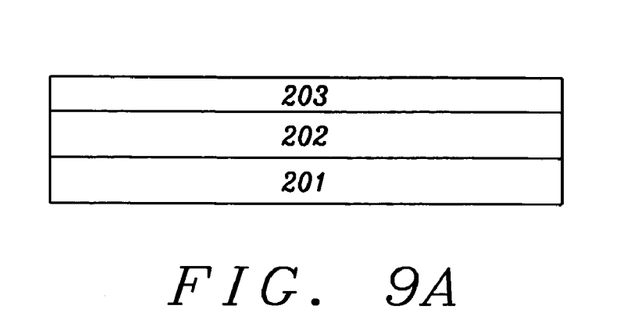
Figure 9B:
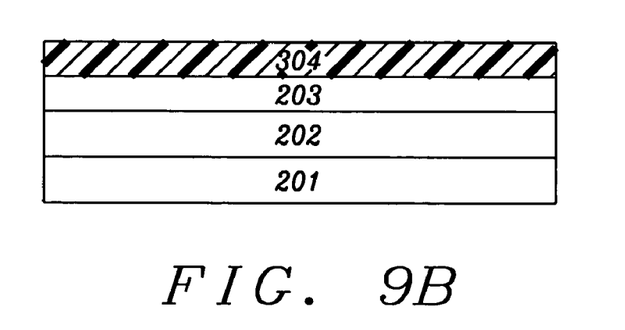
Figure 9C:
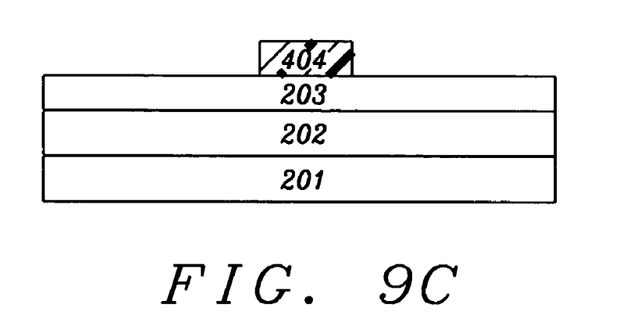
Figure 9D:
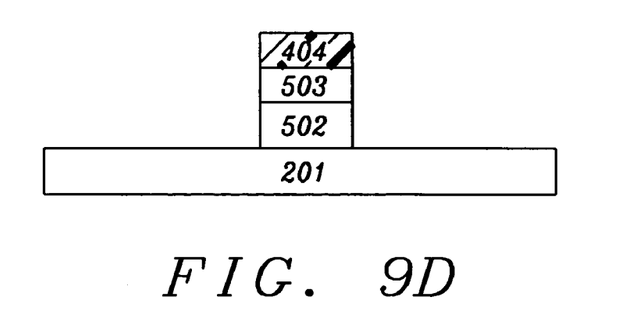
Figure 9E:
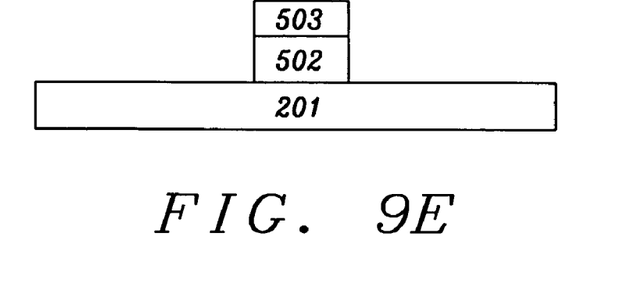
Figure 9F:
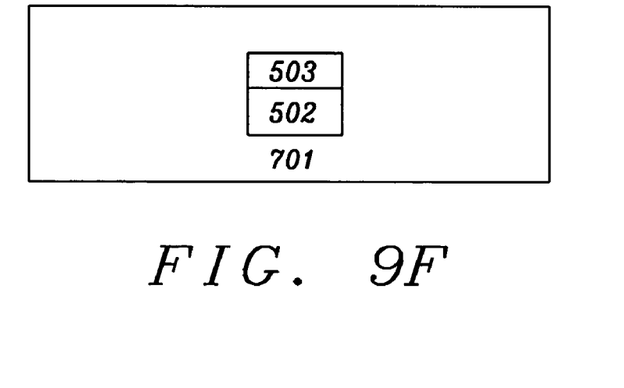

The following applies to FIGS. 9A to 9-F. In another embodiment of this invention, a buffer layer 203 is deposited on top of the waveguide core 202 prior to etching of the core to ensure that the top surface of the etch core is smooth. In this case the despoited layer is etched together with the core. Or, patterning and etching is done first for the buffer layer or for the buffer layer and partially for the core layer. Then complete etching of core layer is done using this buffer layer as hard mask. The top part of this buffer layer will have a refractive index substantially close to the index of layer 201 and smaller than the refractive index of said waveguide and will be deposited before etching of the core. Smooth surfaces are required in waveguides to ensure minimal scattering losses. Creating smooth surfaces and interfaces are particularly challenging when there are at least two waveguide core regions on the same chip which are either non-coplanar or when there are at least two waveguide cores fabricated from dissimilar materials. The waveguide device design and the methodology described below provides for a mechanisms to protect the top surface of at least one of the waveguides during plasma processing.

FIGS. 9-A through 9-F show how this invention allows one to fabricate waveguide cores with smooth top surfaces. The figures show a cross section through the waveguide during processing. In FIG. 9-A the core 202 of the waveguide is deposited on a bottom cladding layer 201. A buffer layer 203 with an index close to, if not identical with, that of cladding layer 201 is deposited on top of the core.

In FIG. 9-B, a layer of photoresist 304 is coated on buffer layer 203. This photoresist 304 can be patterned 404 by photlithography as in FIG. 9-C. FIG. 9-D shows the waveguide core 502 after etching of buffer layer 203 and then core 202 to form the stack consisting of etched buffer layer 503 on top of etched core 502. The advantage of this process sequence is that the etched buffer layer 503, protects the etched core 502 from plasma attack during etch.

FIG. 9-E shows the etched core 502 on top of the cladding 201, with the etched buffer layer 503 still intact after photoresist 404 strip. In this case, the buffer layer 203/etched buffer layer 503 has served its purpose of protecting the top surface of the core 202/etched core 502 from plasma processing from the etch, photoresist 404 strip, any associated cleaning steps or other subsequent process steps including but not limited to chemical mechanical polishing (CMP).

FIG. 9-F shows the completed core 502 embedded in cladding region 701 with the etched buffer layer 503 still remaining. Cladding region 701 was formed by depositing a low index cladding layer over the core 502, etched buffer 503 and underclad 201. In exemplary embodiments the over clad 701 will have a materials refractive index equal to or similar to the under clad 201. If the cladding region 701 matches the index of the etched buffer layer 503, then optically, there will be no discernable interface between etched buffer layer 503 and underclad 201 to form a cladding region 701 around the core 502.

A further annealing step may be optionally be used to fuse the regions 503 and 201 together to form 701. A person skilled in the art will recoginze that the steps outlined in FIGS. 9-A through 9-F may be interleaved with other process steps without changing the overall process flow and the invention.

The buffer layer 203 and etched buffer layer 503 can be used as at least a part of an etch mask for etching of said core 202. In addition, it may be used as a sacrificial region to accommodate resist erosion. The buffer layer 203 could optionally have a graded index distribution to reduce optical losses in the core 202.

Using this method we have proved that it is possible to generate smooth waveguide cores that have a surface roughness of equivalent to that of the deposited layer. The process steps in FIGS. 9-A through 9-F are applicable to situations in which there are multiple waveguide cores as shown in FIGS. 8-A through 8-D. In this case, the steps outlined in FIGS. 9-A through 9-F may be used to fabricated waveguide cores 85 or 86 (see FIGS. 8-A through 8-D).

Any references to front and back, right and left, top and bottom, upper and lower, and horizontal and vertical are, unless noted otherwise, intended for convenience of description, not to limit the present invention or its components to any one positional or spatial orientation. All dimensions of the components in the attached Figures can vary with a potential design and the intended use of an embodiment without departing from the scope of the invention.

While the present invention has been described with reference to several embodiments thereof, those skilled in the art will recognize various changes that may be made without departing from the spirit and scope of the claimed invention.

While particular embodiments of the present invention have been illustrated and described, it is not intended to limit the invention, except as defined by the following claims.

We claim:

1. A method of forming a substantially planar surface of an optical waveguide device, comprising the steps:
    forming at least one waveguide core portion within at least one cladding portion; the waveguide core portion having an upper surface; the cladding portion having a higher portion over at least the waveguide core portion and a lower portion;
    forming a patterned sacrificial portion over the lower cladding portion and a portion of the higher cladding portion, leaving a second portion of the higher cladding portion exposed to form an exposed portion of the higher cladding portion;
    removing at least a portion of the exposed second portion of the higher cladding portion by a selective removal process selective to the patterned sacrificial portion leaving a remnant of the exposed second portion of the higher cladding portion; and
    planarizing:
        a) the remnant of the exposed second portion of the higher cladding portion over the waveguide core portion; and
        b) the lower cladding portion
    to form a planarized cladding portion coplanar with the upper surface of the waveguide core portion, wherein the waveguide core portion comprises at least one waveguide core embedding within at least another waveguide core.

2. The method of claim 1, wherein the planarized cladding portion has a thickness of between about 0 and 200 nm above the upper surface of the waveguide core portion.

3. The method of claim 1, wherein the cladding portion has a first index of refraction; the waveguide core portion has a second index of refraction; and the waveguide core portion second index of refraction is greater than the cladding portion first index of refraction.

4. The method of claim 1, wherein the planarization is a chemical mechanical polishing process.

5. The method of claim 1, wherein the patterned sacrificial portion is comprised of:
    photoresist; or
    photoresist stacked upon a film comprised of: silicon nitride, silicon oxynitride organic silicate glass, diamond like carbon, silicon dioxide, polyimide, PMMA, tantalum, tungsten or molybdenum.

6. The method of claim 1, wherein the cladding portion is comprised of silicon nitride, organic silicate glass, silicon dioxide, polyimide or PMMA.

7. The method of claim 1, wherein the selective removal process selective to the patterned sacrificial portion is a dry and/or wet etching process.

8. The method of claim 1, wherein the patterned sacrificial portion is removed before the planarization.

9. The method of claim 1, wherein the sacrificial portion is photoresist and the patterned sacrificial photoresist portion is removed before the planarization by a stripping process.

10. The method of claim 1, wherein the waveguide core portion is formed using a first mask; and the patterned sacrificial portion is patterned from a sacrificial layer using a second mask that is the reverse of the first mask.

11. The method of claim 1, wherein the planarization also removes any remaining patterned sacrificial portion.

12. The method of claim 1, wherein wave guide core portion is formed using a first mask; and not all the sacrificial portion area is needed to be patterned using a second mask that is the reverse of the first mask.

13. The method of claim 1, wherein the patterned sacrificial portion is also removed during the planarization.

14. The method of claim 1, wherein the planarization includes a fine planarization process.

15. The method of claim 1, wherein the planarization of the remnant of the exposed second portion of the higher cladding portion over the waveguide core portion and the lower cladding portion does not expose the upper surface of the waveguide core portion.

* * * * *